A. MAIRE.
DRIVE FOR PUMPS.
APPLICATION FILED FEB. 18, 1918.

1,308,435. Patented July 1, 1919.

Inventor
Auguste Maire
by Otto Munn

UNITED STATES PATENT OFFICE.

AUGUSTE MAIRE, OF ROUTE DE BEZONS, ARGENTEUIL, FRANCE, ASSIGNOR TO SOCIETE LORRAINE DES ANCIENS ETABLISSEMENTS DE DIETRICH & CIE. DE LUNEVILLE, OF PARIS, FRANCE.

DRIVE FOR PUMPS.

1,308,435.   Specification of Letters Patent.   Patented July 1, 1919.

Application filed February 18, 1918. Serial No. 217,868.

*To all whom it may concern:*

Be it known that I, AUGUSTE MAIRE, a citizen of the Republic of France, residing at Route de Bezons, Argenteuil, Seine and Oise, in the Republic of France, have invented new and useful Improvements in Drives for Pumps, of which the following is a specification.

In dealing with certain liquids and more particularly mineral spirits, it is very difficult to construct pumps having revolving or sliding pump shafts in which the liquids will not leak through to the outside.

This invention has for its object to provide an improved pump in which the above stated drawback is eliminated by an improved drive having no shaft passing through a stuffing box.

The improved drive consists of an armature of soft iron or a permanent magnet driven by the engine and revolving around a box inside of which latter there is journaled a permanent magnet for driving the pump direct, this permanent magnet being caused to rotate by the magnetic flux which passes through the sides of the box owing to the arrangement in the said sides of small blocks of metal having the desired properties of magnetic permeability.

Figure 1:
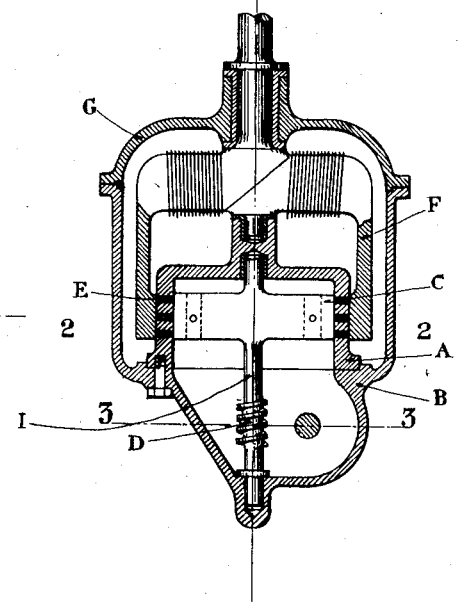

In the accompanying drawings which illustrate two constructional examples of the invention, Figure 1 is a longitudinal axial section of an improved pump drive according to this invention.

Figure 2:
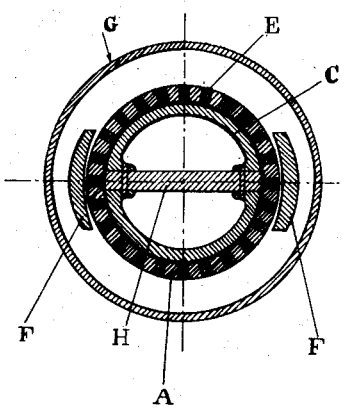
Figure 3:
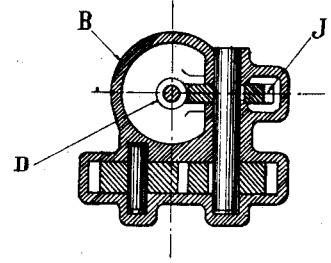

Figs. 2 and 3 are sections taken on the lines 2—2 and 3—3 respectively of Fig. 1.

Figure 4:
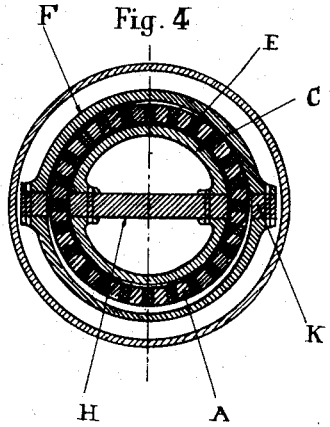

Fig. 4 is a section similar to that of Fig. 2 illustrating a modification.

Referring first to Figs. 1, 2 and 3, A is a fluid-tight box closed by a cover B in which are arranged to move two electro-magnets C set pole to pole and connected to each other by a non-magnetic part H which also serves as a support for the rotary shaft I that is formed with a screw-thread D.

The magnet C revolves with slight friction in the box A, and the side of said box is traversed by pieces E of soft iron which, while making a tight joint between the inside and the outside of the box, allow the magnetic flux to pass through from the inside to the outside.

On the outside of the box A there is arranged to rotate an armature F which is likewise of soft iron and whose pole pieces are journaled with slight friction on the outside of the box. This armature may have a winding as shown in Fig. 1.

The soft iron armature F is situated inside the casing G, and the space between the box A and the box G may be filled with lubricant.

When the armature F is driven from the engine, the magnet C situated inside the box A is caused to have the same motion as the armature, and it will drive in its turn, through the worm D, the wheel J that serves to drive either a geared pump or any other sort of pump in such a manner that the liquid can only pass through the inlet and outlet passages provided in the pump, and so that there is no need to provide any kind of packing for preventing leakage of liquid between the shafts and their journals.

In the modification shown in Fig. 4, instead of the wound armature F there is employed a double permanent magnet F' which is connected by a non-magnetic part K to the driving shaft. In this construction the magnet situated inside the fluid-tight box and the outer driving magnet have a tendency to bring their opposing poles together.

Having now described my invention, what I claim as new and desire to secure by Letters Patent is:

1. A drive for pumps comprising in combination: a fluid tight box, a permanent magnet adapted to rotate substantially in contact with the inside face of a wall of said box, driving means for the pump, controlled by said permanent magnet, blocks of a magnetic material provided in said wall, a fluid tight casing surrounding said wall, and adapted to contain a lubricant, a shaft journaled in said fluid tight casing, a structure adapted to be traversed by a magnetic field said structure being carried by said shaft and having parts thereof which rotate substantially in contact with the outside face of said wall and means for rotating said shaft.

2. A drive for pumps comprising in combination: a fluid tight box, a permanent magnet of a cylindrical shape adapted to rotate substantially in contact with the inside face of a cylindrical wall of said box, driving means for the pump, controlled by said permanent magnet, blocks of a magnetic material provided in said cylindrical wall, a fluid tight casing surrounding said cylindrical wall and adapted to contain a lubricant, a shaft journaled in said fluid tight casing, a structure adapted to be traversed by a magnetic field, carried by said shaft, said structure having projecting arms which partially embrace the outer periphery of said cylindrical wall and rotate substantially in contact therewith, and means for rotating said shaft.

In testimony whereof I have signed my name to this specification in the presence of two subscribing witnesses.

AUGUSTE MAIRE.

Witnesses:
 LOUIS MOSES,
 CHAS. P. PRESSLY.